United States Patent [19]

vanOmmering et al.

[11] Patent Number: 4,614,025

[45] Date of Patent: Sep. 30, 1986

[54] METHOD FOR MAKING A LIGHTWEIGHT BIPOLAR METAL-GAS BATTERY

[75] Inventors: Gerrit vanOmmering, San Francisco; Charles W. Koehler, Fremont, both of Calif.

[73] Assignee: Ford Aerospace & Communications Corporation, Detroit, Mich.

[21] Appl. No.: 686,355

[22] Filed: Dec. 26, 1984

[51] Int. Cl.$^4$ .............................................. H01M 6/00
[52] U.S. Cl. .................................. 29/623.1; 29/623.2
[58] Field of Search .......................... 29/623.1, 623.2; 429/27–29, 210, 211

[56] References Cited

U.S. PATENT DOCUMENTS

| | | | |
|---|---|---|---|
| 3,518,123 | 6/1970 | Katsoulis et al. | 429/28 |
| 3,846,176 | 11/1974 | Kühl | 136/86 R |
| 3,979,224 | 9/1976 | Strasser | 429/18 |
| 4,091,187 | 5/1978 | Kaye | 429/211 X |
| 4,098,962 | 7/1978 | Dennison | 429/72 |
| 4,115,630 | 9/1978 | vanOmmering et al. | 429/72 |
| 4,159,367 | 6/1979 | Berchielli et al. | 429/38 |
| 4,209,575 | 6/1980 | McDowall et al. | 429/211 X |
| 4,225,654 | 9/1980 | Tajima et al. | 429/34 |
| 4,317,864 | 3/1982 | Strasser | 429/36 |
| 4,346,150 | 8/1982 | Bellows et al. | 429/18 |
| 4,390,602 | 6/1983 | Struthers | 429/26 |
| 4,397,917 | 8/1983 | Chi et al. | 429/26 |
| 4,414,294 | 11/1983 | Guthrie | 429/35 |
| 4,416,955 | 11/1983 | Chi | 429/26 |
| 4,420,545 | 12/1983 | Meyer et al. | 429/101 |

OTHER PUBLICATIONS

Koehler, C. W. and VanOmmering, G., "Advanced Bipolar Nickel-Hydrogen Batteries", U.S. Army Power Sources Symposium, Cherry Hill, N.J., Jun. 1984.

Cataldo, R. L. and Smithrick, J. J., "Design of a 35-Kilowatt Bipolar Nickel-Hydrogen Battery for Low-Earth-Orbit Applications", *Proceedings of the 17th IECEC*, pp. 780–785, Aug. 8, 1982.

Cataldo, R. L., "Test Results of a Ten Cell Bipolar Nickel-Hydrogen Battery", *Proceedings of the 18th IECEC*, pp. 1561–1567, Aug., 1983.

Adler, E. and Perez, F., "Development of a Large Scale Bipolar NiH$_2$ Battery", *Proceedings of the 18th IECEC*, pp. 1568–1573, Aug. 1983.

G. vanOmmering and C. W. Koehler, "Bipolar Nickel-Hydrogen Battery System Design", *Proceedings of the 19th Intersociety Energy Conversion Engineering conference*, San Francisco, Calif., 8/19/84.

*Primary Examiner*—Charles F. LeFevour
*Attorney, Agent, or Firm*—Edward J. Radlo; Clifford L. Sadler

[57] ABSTRACT

In a method for fabricating lightweight bipolar metal-gas battery cell stacks (1), a segmented frame (21, 23) for insulating and mechanically supporting the stack (1) is fabricated of dielectric materials. Each cell (3) has associated therewith first and second frame segments (21, 23) associated with negative and positive electrodes (5, 7, respectively). Weld tabs (25, 27) are welded to the negative and positive electrodes (5, 7, respectively), and are welded together external to the cell frame (21, 23). Electrolyte is added to each cell (3), preferably as it is fabricated within the enveloping cell frame segments (21, 23). Alignment rods (34) align the stack (1) components, and assist in compression-sealing adjacent frame segments (21, 23) by means of compressing mating tongues (43) and grooves (41).

9 Claims, 9 Drawing Figures

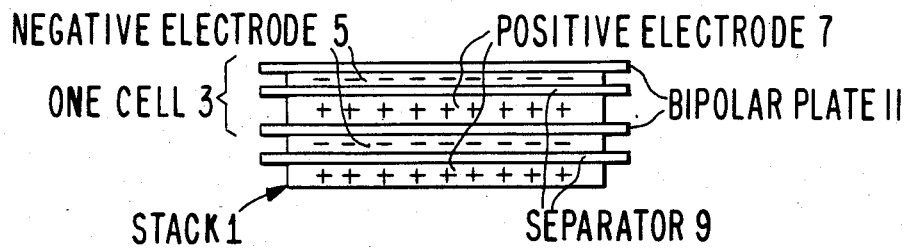
FIG.1 PRIOR ART
SIMPLIFIED BIPOLAR BATTERY COMPONENT SEQUENCE
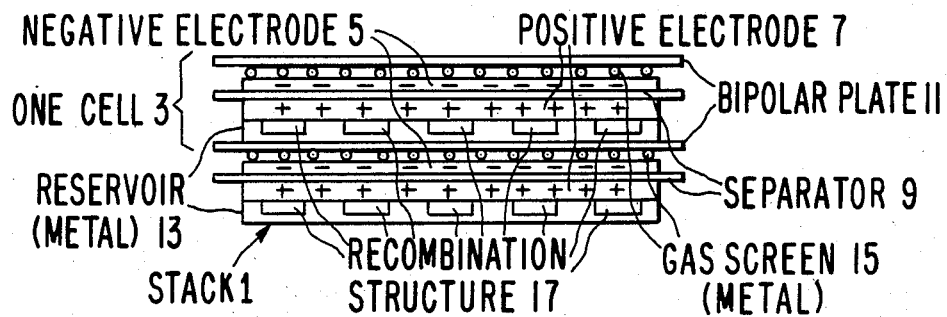
FIG.2 PRIOR ART
METAL-GAS BIPOLAR BATTERY COMPONENT SEQUENCE
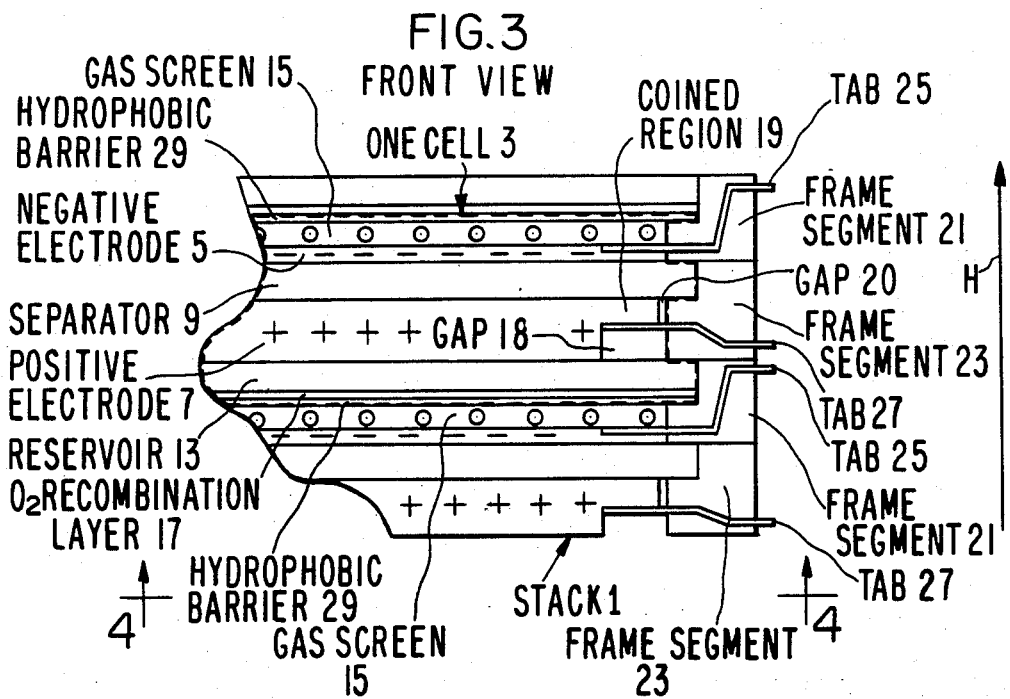
FIG.3 FRONT VIEW

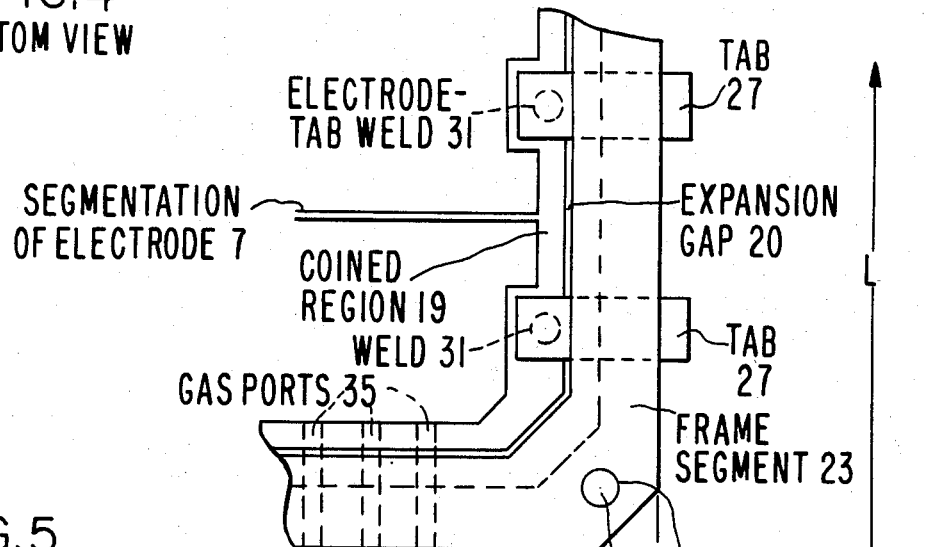
FIG. 4
BOTTOM VIEW
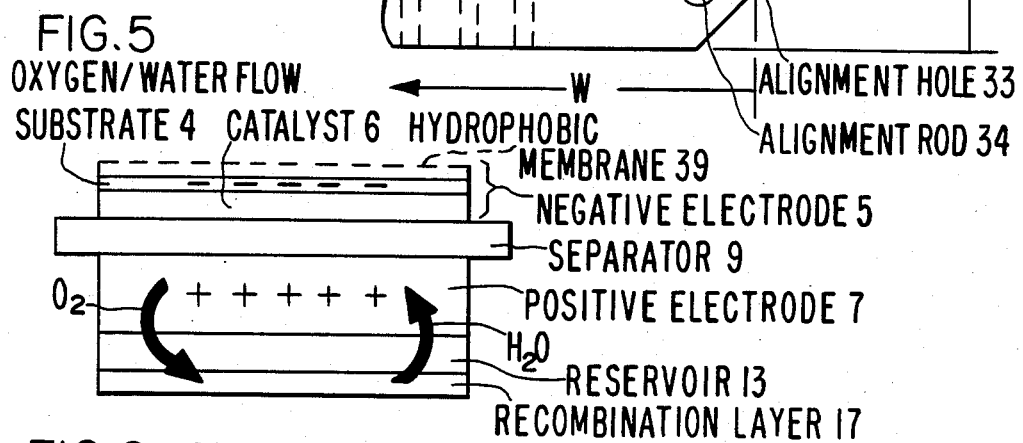
FIG. 5
OXYGEN/WATER FLOW
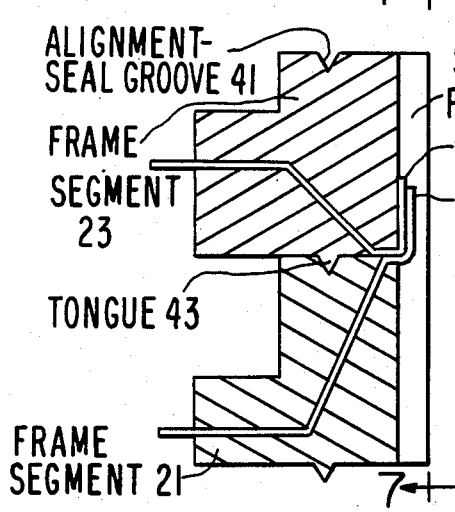
FIG. 6 BIPOLAR INTERCONNECT AND FRAME DETAIL
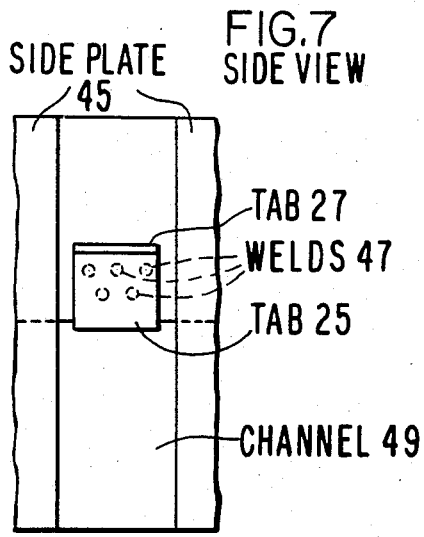
FIG. 7
SIDE VIEW

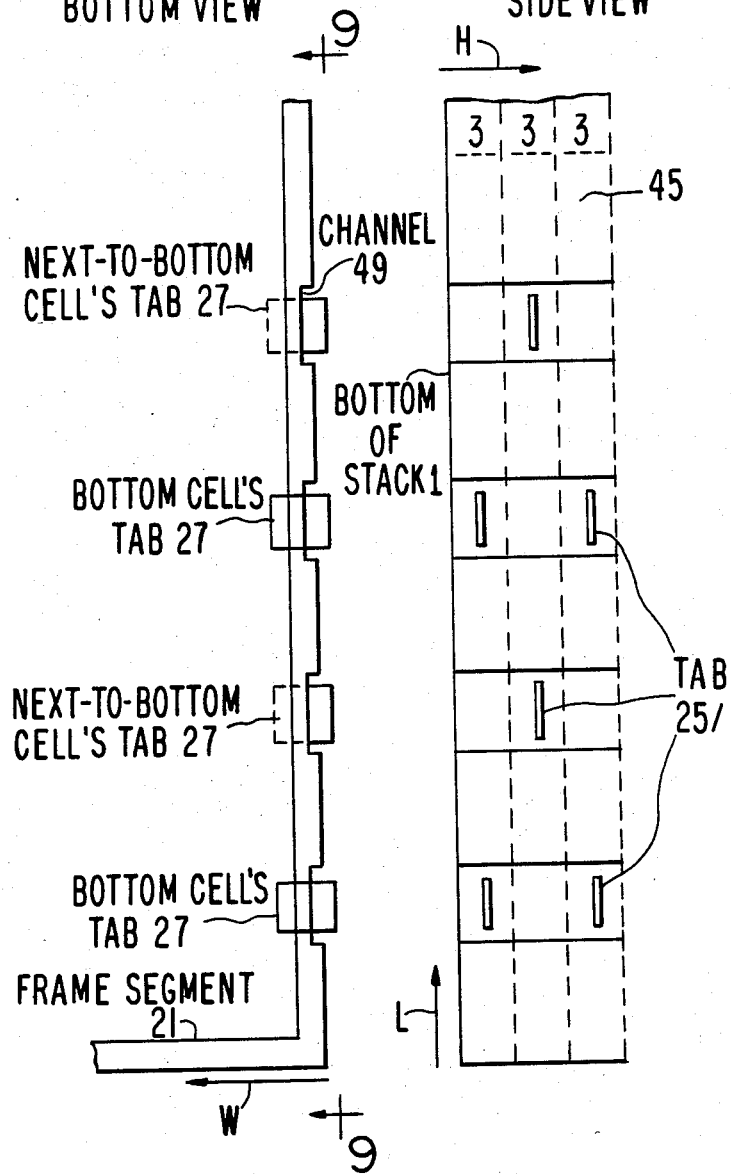

METHOD FOR MAKING A LIGHTWEIGHT BIPOLAR METAL-GAS BATTERY

DESCRIPTION

1. Technical Field

This invention pertains to the field of bipolar metal gas batteries, i.e., batteries having two reactants, a metal and a gas, and in which positive and negative electrodes are combined as one.

2. Background Art

Bipolar metal-gas batteries can be used for large scale energy storage on spacecraft, and in terrestrial applications such as utility load leveling and electric vehicles. Bipolar batteries of the prior art (see FIG. 1) typically rely on a bipolar plate 11 situated between a positive electrode 7 of one cell 3 and a negative electrode 5 of an adjacent cell 3 in a series-connected battery stack 1. This plate 11 serves two main functions: the electrical connection of the two electrodes 5, 7 and the physical separation of liquid electrolytes present in adjacent cells 3. In battery systems with solid negative and positive electrodes 5, 7, respectively (FIG. 1), this plate 11 can be a simple, relatively thin membrane made of a metal that is stable in the cell 3 environment. When one of the electrodes 5, 7 is a gas electrode (negative electrode 5 in FIG. 2), the function of the plate 11 becomes more complicated, because it must now also provide for gas flow passages to one side of the gas electrode 5 by means of a screen 15. When the positive electrode 7 gasses on overcharge, a porous reservoir 13 may be needed on one side of the solid electrode 7, to temporarily store electrolyte. This further complicates the bipolar structure. In addition, recombination sites for secondary gasses may be needed within or adjacent to the reservoir 13. Thus, the basic structure goes from the simple design of FIG. 1 to the complex arrangement of FIG. 2. A weight penalty is incurred, because the gas flow screen 15 and the reservoir 13 must be metallic to provide electrical conductivity between the negative and positive electrodes 5, 7, respectively. In the present invention, the bipolar plate 11 is eliminated, saving weight; the series electrical connections are made external to the cells 3 themselves. As a consequence, neither the gas flow screens 15 nor the reservoirs 13 have to be metallic. This permits the use of lightweight, nonmetallic compressible screens 15 and reservoirs 13. The compressibility feature is desirable because of gradual expansion of the positive electrodes 7 as they undergo long term electrical cycling.

Koehler, C. W. and vanOmmering, G., "Advanced Bipolar Nickel-Hydrogen Batteries" is a hard copy of a set of viewgraphs that was visually presented but not otherwise disseminated at the U.S. Army Power Sources Symposium in Cherry Hill, N.J., in June, 1984. The sections labeled "Design II" pertain, in a general sense, to the present invention. A subset of these same viewgraphs was visually shown but not otherwise disseminated by the same authors/inventors at the 19th Intersociety Energy Conversion Engineering Conference in San Francisco, Calif., on Aug. 22, 1984. The vanOmmering/Koehler paper entitled "Bipolar Nickel-Hydrogen Battery System Design" was distributed to the attendees of this conference on August 19, 1984.

Cataldo, R. L. and Smithrick, J. J., "Design of a 35-Kilowatt Bipolar Nickel-Hydrogen Battery for Low-Earth-Orbit Applications", *Proceedings of the 17th IECEC*, pp. 780–785, dated Aug. 8, 1982; and Cataldo, R. L., "Test Results of a Ten Cell Bipolar Nickel-Hydrogen Battery", *Proceedings of the 18th IECEC*, pp. 1561–1567, dated August, 1983, disclose nickel-hydrogen bipolar batteries in which metallic bipolar plates and metallic reservoirs are employed.

Adler, E. and Perez, F., "Development of a Large Scale Bipolar $NiH_2$ Battery", *Proceedings of the 18th IECEC*, pp. 1568–1573, dated August, 1983, discloses a bipolar nickel-hydrogen battery having heavy metallic bipolar plates that are used for cooling, make short circuits between adjacent cells more likely, and fail to provide for the normal expansion of the positive electrodes.

U.S. Pat. No. 4,098,962 discloses a metal-gas bipolar battery with no bipolar plate, but differing from the present invention in that: (1) no provision is made for confinement of electrolyte or of secondary gas; (2) gas screen 68 must be an electrical conductor; (3) the contacts from screen 68 to the adjacent electrodes are pressure contacts rather than welded contacts; and (4) no electrolyte reservoir is disclosed.

U.S. Pat. No. 4,115,630 discoses a metal-hydrogen battery. FIG. 2 shows a bipolar configuration in which connections between oppositely polarized electrodes of adjacent cells skip over intervening non-connected electrodes. The tabs 96,98 shown in FIGS. 5 and 6 (which pertain to a non-bipolar configuration) are for parallel connections within a single cell, not for series connections between adjacent cells of a multi-cell stack as in the present invention. This patent further differs from the present invention in that: (1) no reservoirs and screens are disclosed; (2) item 34 gives only partial confinement of electrolyte and no confinement of the secondary (oxygen) gas; (3) the teflon coating on the negative electrode is mandatory (column 5, lines 45–52) because hydrogen consumption and oxygen recombination occur here and it is desired to prevent water from flooding the negative electrode, thus blocking gas access. In the present invention, on the other hand, the use of teflon or other hydrophobic coating 39 on the negative electrode 5 is optional since no oxygen recombination is performed there.

U.S. Pat. No. 4,159,367 shows a bipolar metal-gas battery in a gasket frame. The reference battery differs from the present invention in that: (1) it uses bipolar plates; (2) the gas screens must be electrically conductive; (3) the gas screens don't accommodate positive electrode expansion; (4) the gas screens make inferior pressure contacts to the negative electrodes and bipolar plates; (5) no electrolyte reservoirs are disclosed; (6) the gaskets are not stated to be hydrophobic; and (7) secondary gas (oxygen) is confined within each cell but not at sites proximate the positive electrode; as a result, the cells in the reference patent are subject to explosions because the oxygen must travel through the separator to the negative electrode, which is coated with platinum catalyst. Furthermore, no means are disclosed to return the water from the recombination sites on top of the teflon-backed negative electrode back to the positive electrode.

U.S. Pat. No. 4,346,150 discloses a battery in which electrolyte is circulated from cell to cell, rather than confined within each cell as in the present invention.

U.S. Pat. No. 4,420,545 discloses a lightweight metal-gas battery but not a bipolar battery.

U.S. Pat. Nos. 3,846,176, 3,979,224, 4,225,654, 4,317,864, 4,390,602, 4,397,917, 4,414,294, and 4,416,955 pertain to fuel cells, in which the reactants are two gasses or one gas and one liquid, rather than a metal and a gas as in bipolar batteries.

DISCLOSURE OF INVENTION

The present invention is a bipolar metal-gas battery comprising one or more stacks (1), in which the heavy bipolar plate (11) of the prior art is beneficially eliminated, and yet electrolyte and secondary (overcharge) gasses are beneficially confined within each cell (3). Reactant gas screens (15) and electrolyte reservoirs (13) can be made of lightweight, nonmetallic compressible material, accommodating expansion of the positive electrodes (7). The weld tabs (25, 27) and welds (47) used to join the negative and positive electrodes (5, 7, respectively) make for better electrical conductivity than the pressure connections formed when using bipolar plates (11).

The cell (3) components of the instant invention are mechanically supported by a dielectric frame (21, 23) which also contributes to the confinement of electrolyte within each cell (3). The invention also advantageously provides for secondary (overcharge) gas confinement within each cell (3). Furthermore, mass balance (of water, secondary gas, and electrolyte) is beneficially maintained among cells (3).

The frames (21, 23) are designed and shaped to allow for easy, inexpensive assembly and automatic alignment of all cell (3) components.

The invention permits the use of an optical hydrophobic backing layer (39) on the negative electrode (5), positively maintaining the reactant gas-electrolyte interface within a catalyst layer (6) on the negative electrode (5).

The invention allows for some unavoidable expansion of the positive electrodes (7) over time, without buildup of high pressures in the battery stack (1) or disruption of the cell-to-cell seals, because the slightly compressible reservoirs (13) and gas screens (15) accommodate expansion. Prior art designs having more rigid metallic components cannot accommodate this expansion without a high risk of battery failure.

The invention is applicable to batteries which do not require operation at extremely high peak power levels; such power levels require the heat conduction properties inherent in metallic bipolar plates (11).

BRIEF DESCRIPTION OF THE DRAWINGS

These and other more detailed and specific objects and features of the present invention are more fully disclosed in the following specification, reference being had to the accompanying drawings, in which:

FIG. 1 is a front view of a simplified bipolar battery stack 1 of the prior art;

FIG. 2 is a front view of a metal-gas bipolar battery stack 1 of the prior art;

FIG. 3 is a front view of a metal-gas bipolar battery stack 1 of the present invention with the front wall of the frame 21, 23 removed;

FIG. 4 is a bottom view of the stack 1 illustrated in FIG. 3;

FIG. 5 is a front view of a cell 3 of the present invention showing oxygen and water flow;

FIG. 6 is a front cross-sectional view of the frame segments 23, 21 of the present invention;

FIG. 7 is a side view of the frame segments 23, 21 illustrated in FIG. 6;

FIG. 8 is a bottom view of a stack 1 of the present invention showing staggered weld tabs 27; and FIG. 9 is a side view of the stack 1 illustrated in FIG. 8.

BEST MODE FOR CARRYING OUT THE INVENTION

This specification describes a nickel-hydrogen version of this battery. However, the invention is directly applicable to the other bipolar metal-gas batteries, upon the substitution of materials as is well known to those of ordinary skill in the art. In a nickel-hydrogen battery, the reactants are nickel (present at the positive electrode 7) and pressurized hydrogen gas, which permeates all of the cells 3. Several cells 3 are stacked in at least one stack 1. The stacks 1 are enclosed within an enveloping pressure vessel (not illustrated). Two or more stacks 1 may be placed side-by-side within the pressure vessel. Oxygen gas is produced at the positive electrode 7 during overcharge; this overcharge gas is herein called "secondary gas". Liquid potassium hydrogen electrolyte permeates each cell 3 and constitutes a medium for ion transport.

The sequence of active components defining each cell 3 is shown in FIG. 3 and is: hydrophobic barrier 29, gas diffusion screen 15, negative electrode (anode) 5, separator 9, nickel positive electrode (cathode) 7, electrolyte reservoir 13, oxygen recombination layer 17, and hydrophobic barrier 29. The confines of each cell 3 are indicated by means of a dashed line in FIG. 3. A cell 3 may be defined as the generator of a unit voltage. Electrically series-connecting several cells 3 increases the voltage.

Gas screen 15 can be metallic but is preferably made of a lightweight, e.g., plastic, material that is compressible to accommodate long-term expansion of the nickel positive electrode 7. Screen 15 is porous and provides passageways through which the reactant $H_2$ gas can reach the negative electrode 5 from regions external to the frame 21, 23.

Reactant hydrogen gas is consumed at the negative electrodes 5 when the battery is discharging, and produced at the negative electrodes 5 when the battery is charging. Each electrode 5 preferably comprises a photo-etched perforated nickel grid substrate 4 covered on its surface facing separator 9 with a sintered platinum catalyst 6 (FIG. 5). The substrate 4 is preferably unperforated in regions where the negative tab 25 welds are made. An optional porous hydrophobic layer 39, preferably fabricated of teflon, is placed onto or as part of substrate 4. Again, such a layer 39 is not placed on areas where tabs 25 are welded to electrode 5. The catalyst layer 6 and hydrophobic layer 39 can be made using silk screen techniques, or by applying pre-fabricated layers 6, 39 to the substrate 4. The region of tab 25 facing gas screen 15 may be teflonated to avoid buildup of electrolyte in this area.

Hydrophobic layer 39, by preventing electrolyte from migrating to gas screen 15 while allowing $H_2$ to flow onto catalyst 6, positively maintains the proper $H_2$/electrolyte balance at the proper location (catalyst 6). It should be noted that such a hydrophobic layer 39 cannot be used with those batteries of the prior art using bipolar plates 11, because in such batteries electrical contact must be made between gas screen 15 and negative electrode 5, and thus no dielectric material may be interposed. As a consequence, such prior art batteries are prone to suffer from the problem of electrolyte flooding the surface of the negative electrode 5 facing the gas screen 15. This flooding inhibits $H_2$ from reaching the negative electrode 5.

Separator 9 is made of a material which allows the passage of electrolyte therethrough but has a high bubble pressure and thus inhibits the passage of $O_2$ gas. A suitable material for separator 9 is asbestos.

The positive electyrode 7 is nickel in the nickel-hydrogen battery illustrated herein. NiOOH is formed on the positive electrodes 7 during charging, and is reduced to $Ni(OH)_2$ when the battery is discharging.

Reservoir 13 can be metallic but is preferably made of a lightweight compressible bibulous porous material that can withstand the ravages of the KOH electrolyte and has a low bubble pressure. Reservoir 13 is placed against the lower side of positive electrode 7. A suitable material for reservoir 13 is polypropylene felt, which has a poor size distribution that alows it to readily yield most of its electrolyte content to positive electrode 7 as desired during normal charge and discharge cycles. During overcharge, reservoir 13 absorbs and retains electrolyte displaced from positive electrode 7 due to gassing of oxygen. The relative pore sizes of separator 9 and reservoir 13 are such that separator 9 forms a much more effective gas barrier than reservoir 13. As a result, the oxygen is forced into and through reservoir 13, as illustrated in FIG. 5, where it combines with $H_2$ that has passed through barrier 29, forming water, which flows back to positive electrode 7 as desired. Reservoir 13 also accommodates the changing pore sizes of the nickel electrode 7 over time.

The total cell 3 electrolyte inventory is chosen so that reservoir 13 is only partially filled with electrolyte during overcharge, so that the oxygen will pass through reservoir 13 relatively easily on its way to recombination layer 17, and so that the electrolyte displaced from positive electrode 7 on overcharge can flow into reservoir 13 without completely filling it. Recombination layer 17 can be a metal screen or a perforated metal sheet covered with dispersed platinum powder. Alternatively, a platinum impregnated reservoir-type dielectric material can be used. The fact that oxygen is confined, by means of the mechanisms just described, to the cell 3 in which generated is highly desirable, because otherwise, that cell 3 would effectively lose water, impairing the operation of that cell's positive electrode 7. Furthermore, the excess water would migrate to another cell 3 where it could flood said cell's negative electrode 7, preventing the consumption of hydrogen at that electrode.

Hydrophobic barrier 29 defines the upper and lower contours of each cell 3, and is preferably thin and fabricated of teflon. Such a barrier 29 is gas permeable and thus allows hydrogen to access the recombination sites 17 from gas screens 15, and at the same time forms an electrolyte barrier between adjacent cells 3. It is highly desirable to thus confine electrolyte within each cell 3, in order to avoid cell-to-cell short circuits.

The dielectric cell frame 21, 23 is formed in the shape of a holowed-out rectangular prism in the embodiment illustrated, because the cell 3 components are rectangular. Frame 21, 23 has a height H, a length L, and a width W (FIGS. 3 and 4). In the plane of FIG. 4, frame 21, 23 has the shape of a rectangular periphery surrounding the cell 3 components. The front wall of frame 21, 23 has been removed in FIG. 3 so that the cell 3 components may be viewed. Frame 21, 23 provides mechanical support for the individual cell 3 components.

Each cell 3 has associated therewith two frame segments, 21 and 23, respectively, as shown in FIGS. 3 and 6. Segment 21 surrounds the negative electrode 5, gas screen 15, barrier 29, recombination layer 17, and reservoir 13. Segment 23 surrounds the positive electrode 7 and separator 9. Metal tabs 25, 27, preferably fabricated of nickel, are molded in place in segments 21 and 23, respectively, during frame 21, 23 manufacture. Tabs 25, 27 are used to form the bipolar connection between adjacent cells 3 by welding them together external to the frame 21, 23 following stack 1 assembly. Holes 35 in frame segments 21 provide access for the hydrogen, typically pressurized to several hundred PSI, to enter gas screens 15 from outside frame 21, 23 (FIG. 4).

Materials for the cell frame 21, 23 must be electrically insulating, and preferably hydrophobic to enhance electrolyte confinement within each cell 3 and to assist in keeping the hydrogen access holes 35 positively free from electrolyte blockage and leakage. Frame 23 does not need to be hydrophobic because hydrogen holes 35 are not present in frame 23. Thus, suitable materials choices are teflon for frame segments 21 and polysulfone for frame segments 23; or teflon for all frame segments 21, 23. Considerations influencing material choice include structural rigidity, KOH compatibility, need to equalize coefficient of thermal expansion if different materials are selected for frame segments 21 and 23, thermal conductivity, and cost of processing.

Positive sealing between the frame segments 21, 23, an important aspect of the electrolyte confinement program, is preferably accomplished with a tongue 43 and groove 41 arrangement as indicated in FIG. 6, with each tongue 43 height slightly exceeding its mating groove 41 depth. The tongues 43 and grooves 41 preferably extend around the entire L-W-L-W periphery of the frame 21, 23. The hardness of each mating tongue 43 and groove 41 is preferably different, to facilitate formation of compression seals between adjacent segments 21, 23. In addition to the alignment provided by the tongues 43 and grooves 41, frame segments 21, 23 are provided with holes 33 through which stack alignment rods 34 can pass (FIG. 4). Holes 33 can be situated every few inches along the L and W dimensions of the frame 21, 23. The ends of the alignment rods 34 are threaded to receive end plates (not illustrated) which compress the components of stack 1 together and provide the compression required for the tongue 43 and groove 41 seal. The bottom end plate has been removed in FIGS. 4 and 8.

Frame 21, 23 can be manufactured by molding or machining, the former method being more suitable for high volume production. Thermoplastics such as polysulfone can be readily injection or compression molded (compression molding being more appropriate for parts of large size). Since teflon doesn't mold, sintering, in which powdered teflon is the starting material, can be used to fabricate teflon frames 21, 23.

An important feature of this invention is the reliable, simple, and inexpensive way in which the stacks 1 are assembled. The process starts with placing a positive electrode 7 in a frame segment 23, and welding electrode 7 to the tabs 27 which protrude within the periphery formed by segment 23. Electrode 7 preferably has coined regions 19 coinciding with the tab 27 locations (FIGS. 3 and 4) for strengthening the electrode/tab welds 31. The area of coined regions 19 is kept small to maximize the active area of electrodes 7. A separator 9 is then placed into segment 23, which is preferably ledged just below the separator 9 to enhance the confinement of oxygen.

A negative electrode 5 is similarly welded into a frame segment 21; here the tabs 25 are welded to areas of the negative electrode substrate 4 which are kept free of the catalyst 6 and optional hydrophobic material 39. Each frame segment 21, with the negative electrode 5 in place, now forms a receptacle for a gas screen 15, a hydrophobic barrier 29, a recombination layer 17, and a reservoir 13, which are cut to the appropriate size and placed into frame segment 21, which automatically aligns these components. Note (FIG. 3) that segment 21 is ledged just below barrier 29, to enhance the electrolyte confinement power of barrier 29. These segment 21 and 23 assemblies are now alternately stacked, and are aligned via the alignment rods 34 and by the tongue 43 and groove 41 mating. Preferably, electrolyte is added cell-by-cell during stack 1 assembly. Holes (not illustrated) can be drilled in frame 21, 23 to provide access for electrolyte activation in an alternate embodiment in which electrolyte is introduced into stack 1 after assembly of the cell 3 components.

The regions of the tabs 25, 27 external to the stacked frame segments 21, 23 are then welded together at welds 47 to form the bipolar connections (FIG. 7). If a smooth external stack 1 surface is desired for cooling or other purposes, the welded tabs 25, 27 may be bent into channels 49 recessing a side plate 45 mounted on the outside surface of the frame 21, 23. Channels 49 are then filled with an epoxy to provide a smooth insulating surface, ensuring good thermal contact with a cooling system, such as that described in U.S. patent application Ser. No. 658,015, filed Oct. 5, 1984, entitled, "Active Cooling System for Electrochemical Cells". Because the length of the protruding portions of the tabs 25, 27 exceeds the cell 3 thickness, to facilitate welding, the frame 21, 23 is designed so that alternate tab 25/27 interconnects are staggered (FIGS. 8 and 9). This eliminates interference (touching) between tabs 25/27 from adjacent cells 3 after the tabs 25/27 are bent into the channels 49. FIG. 9 shows the tab 25/27 interconnects before they have been bent into the channels 49.

The electrodes 5, 7 and other stack 1 components may be die cut to the required shape and dimensions. The dimensions of the nickel electrodes 7 are slightly smaller than the allocated space within frame segments 23 (note the expansion gaps 18 and 20 in FIGS. 3 and 4), to allow for an inevitable small amount of in-plane expansion of the nickel electrodes 7 over a long life. Many weld tabs 27 are preferably used for each positive electrode 7 and corresponding frame segment 23, typically one tab 27 every two inches along the L dimension of segment 23 depending upon the current density. This allows for segmentation of the positive electrode 7 along the L dimension (FIG. 4), further accommodating growth in the size of electrode 7 over time.

For ease of handling, it may be convenient to install each negative electrode 5 in its frame segment 21 prior to sintering of the catalyst 6 onto the substrate 4 and formation of the barrier 39.

Hydrophobic barrier 29 requires good sealing at its edges (i.e., at segment 21), and adequate support over its surface area. Gas screen 15 helps to provide this support. To enhance both edge sealing and support, barrier 29 may be bonded to a metal grid (not illustrated), similar to that used as substrate 4 for the negative electrode 5, with an integral continuous border enhancing the edge seal. This optional grid also supports the recombination layer 17. For this configuration, a negative electrode 5 can be used for recombination layer 17 and hydrophobic barrier 29.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for constructing a multi-cell bipolar metal-gas battery stack, in which a metal and a primary gas are reactants, said method comprising the steps of:
    fabricating a dielectric frame generally in the shape of a hollowed-out prism having inner width and inner length dimensions defining the common width and the common length of each stacked cell;
    placing, within the hollowed-out portion of the frame, substantially planar solid components constituting several substantially identical stacked cells, wherein each cell comprises positive and negative electrodes separated by an electrolyte impervious layer; and
    electrically series-connecting adjacent cells by means of forming, outside the frame, electrical connections between oppositely polarized electrodes from adjacent pairs of cells;
    wherein the frame confines, within each cell, electrolyte and secondary gas generated by the positive electrode of said cell; and
    all of the cells have equal access to a common supply of the primary gas.

2. The method of claim 1 wherein electrolyte is loaded into each cell prior to completion of the assembly of the solid components constituting that cell.

3. The method of claim 1 wherein each cell is surrounded on four sides that are orthogonal to the planes of the cell components by two segments of the dielectric frame, a first frame segment surrounding the negative electrode and a second frame segment surrounding the positive electrode.

4. The method of claim 3 wherein one of the frame segments is provided with a groove in a plane parallel to said segment's associated electrode, and the other of the frame segments is provided with a tongue in a plane parallel to said segment's associated electrode, wherein the groove accepts therewithin the tongue as the frame segments are assembled together.

5. The method of claim 3 wherein elongated rods are inserted through the frame segments in a direction orthogonal to the planes of the cell components, thereby aligning said components;
    then end plates are fitted onto the ends of the rods and squeezed together, thereby compression-sealing said frame segments.

6. The method of claim 3 wherein, for each cell:
    a positive electrode, segmented in its plane, is welded to a plurality of metallic weld tabs protruding through the second frame segment; and
    a secondary-gas-impregnable separator having a planar area greater than that of the positive electrode is placed onto the positive electrode and onto a ledge in the second frame segment which accommodates said separator's additional area.

7. The method of claim 3 wherein, for each cell:
    a negative electrode is welded to a metallic weld tab protruding through the first frame segment;

a compressible gas screen is placed onto the negative electrode; and an electrolyte impervious layer, having a planar area greater than that of the negative electrode and gas screen, is placed onto the gas screen and onto a ledge in the first frame segment which accommodates said electrolyte impervious layer's additional area.

8. The method of claim 7 wherein a secondary gas recombination layer is placed onto the electroyte impervious layer; and a compressible electrolyte reservoir is placed onto the recombination layer.

9. The method of claim 7 wherein the negative electrode comprises a perforated nickel substrate having first and second sides, said first side being coated with a platinum catalyst and said second side being coated with a hydrophobic membrane.

* * * * *